Figure 1:
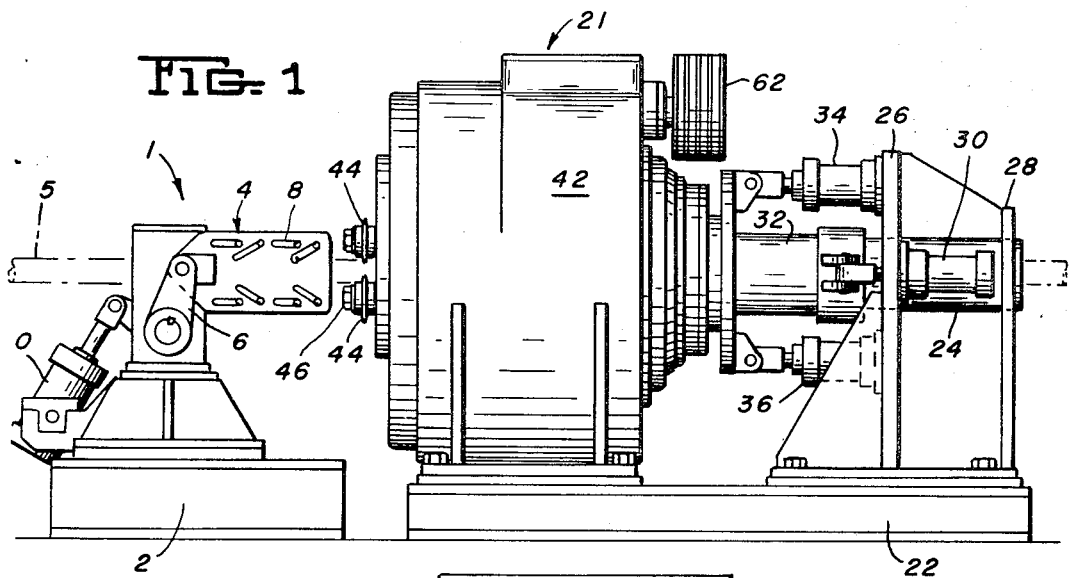

United States Patent [19]
Randich

[11] 3,724,302
[45] Apr. 3, 1973

[54] METHOD AND APPARATUS FOR SEVERING TUBES

[75] Inventor: Erasmus A. Randich, Pittsburgh, Pa.

[73] Assignee: Allegheny Ludlum Industries, Inc., Pittsburgh, Pa.

[22] Filed: July 29, 1971

[21] Appl. No.: 167,525

Related U.S. Application Data

[62] Division of Ser. No. 854,349, Aug. 4, 1969, Pat. No. 3,613,489.

[52] U.S. Cl. ..............................................82/47 R
[51] Int. Cl. ...............................................B23b 1/00
[58] Field of Search............................................82/47

[56] References Cited

UNITED STATES PATENTS 3,108,819   10/1963   McKay.....................................82/47

Primary Examiner—Harrison L. Hinson
Attorney—Richard A. Speer et al.

[57] ABSTRACT

The application describes a method and apparatus for accurately severing tubes and pipes, preferably with a burr free cut. Tubes are clamped into position and severed by means of cutters. The cutters and tubes are in relative revolvement. Clamping is preferably done in a manner which exerts a tensile stress in the axial direction of the tube. The tensile stress substantially precludes burr formation. A preferred cutter is an edge tool with a rounded cutting edge.

5 Claims, 6 Drawing Figures

METHOD AND APPARATUS FOR SEVERING TUBES

This application is a division of copending application Ser. No. 854,349 filed Aug. 4, 1969 now U.S. Pat. No. 3,613,489.

This application relates to a method and apparatus for severing tubes and pipes and more particularly to a method and apparatus for accurately severing tubes and pipes with a burr free cut.

The manufacture of tubes and pipes, hereinafter referred to as tubes, generally involves a severing operation. Prior to this invention, severing had been a problem as it induced the formation of burrs which necessitated a costly and time-consuming burr removal operation. I have solved this problem by developing an efficient and accurate severing method and apparatus which substantially precludes burr formation.

According to my invention, tubes are clamped into position and severed by means of cutters. The cutters are in relative revolvement with the tubes; i.e., the cutters revolve with respect to the tubes or the tubes revolve with respect to the cutters. Clamping is preferably done in a manner which exerts a tensile stress in the axial direction of the lengths being severed. I have found that burr formation can be substantially precluded by applying tensile stresses during severing. The type of cutters employed depends upon certain variables, such as the type of material being severed and its wall thickness and lies within the discretion of the operator. Typical cutters are edge tools, oxyacetylene zorches, plasma arc torches and lasers. They can be shaped and/or arranged so as to make both straight cuts, i.e., cuts perpendicular to the axial direction of the tubes, and beveled cuts. A preferred cutter is a wedge shaped edge tool with a rounded cutting edge. It further contributes to the prevention of burr formation by setting up a rolling action at the point of contact, thereby forming shear stresses in the tensile stressed tubes.

It is accordingly an object of this invention to provide novel apparatus for severing tubes.

It is another object of this invention to provide apparatus for severing tubes which substantially precludes burr formation.

It is a further object of this invention to provide a method for severing tubes which substantially precludes burr formation.

Figure 2:
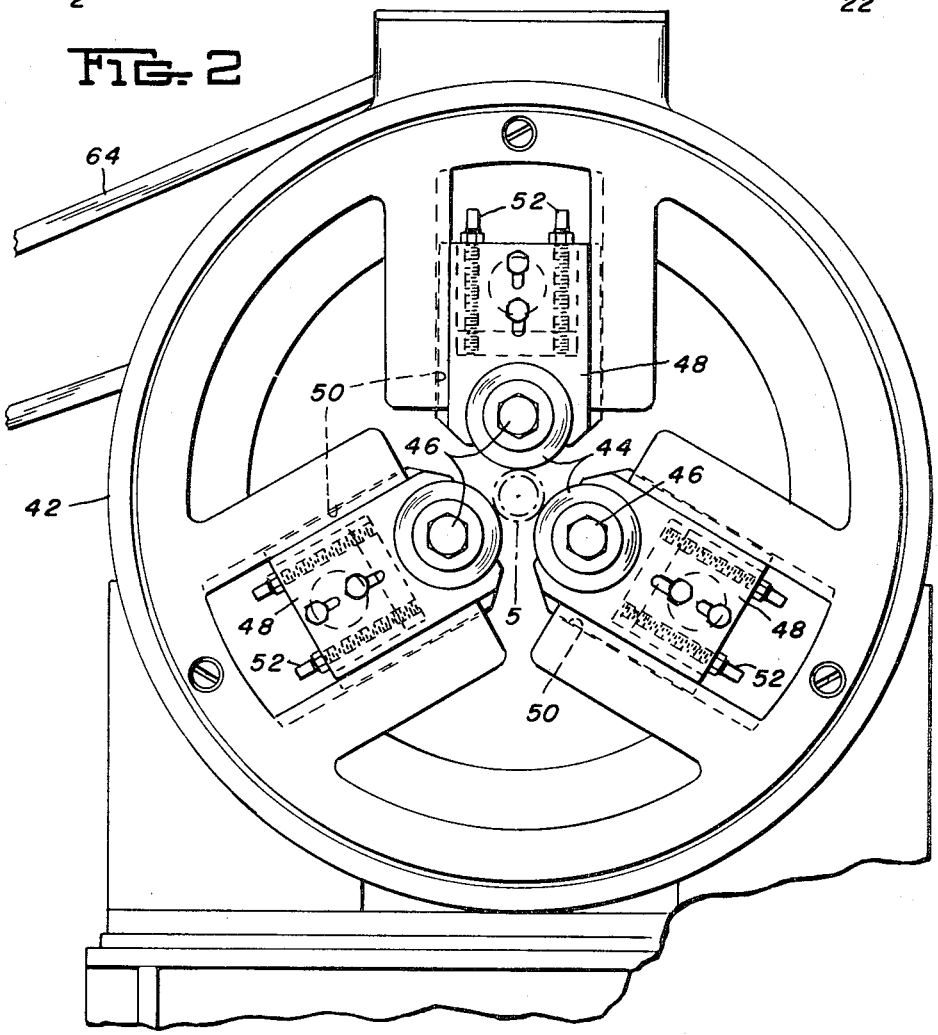
Figure 3:
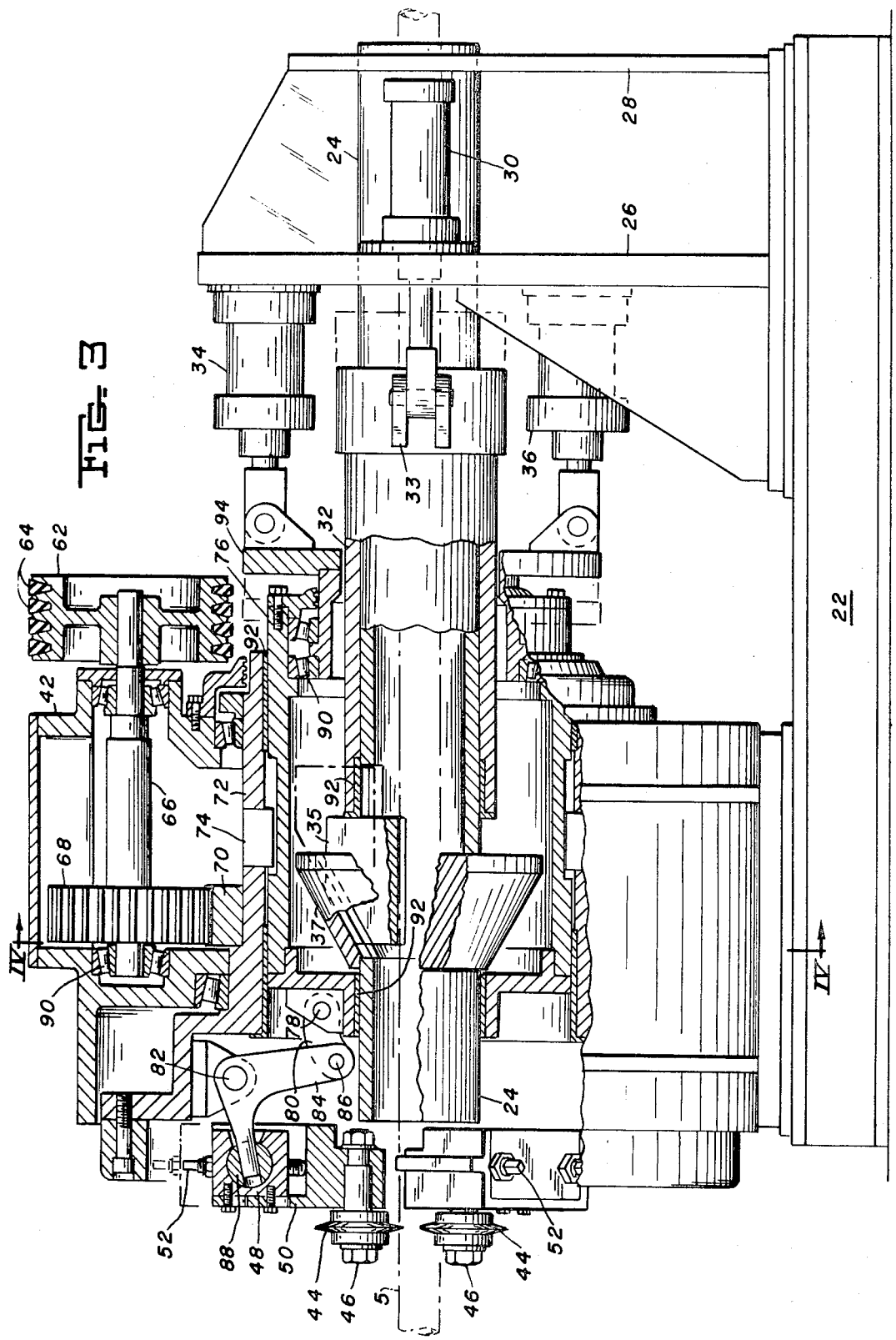
Figure 4:
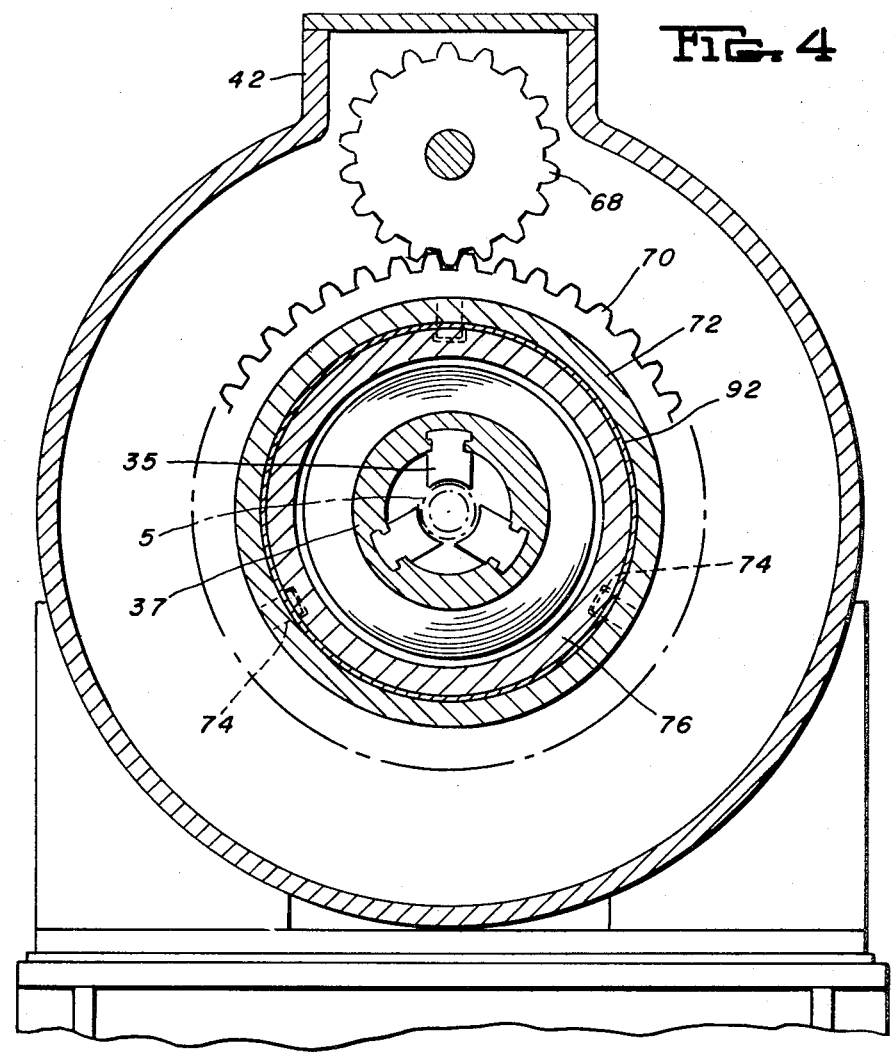
Figure 5:
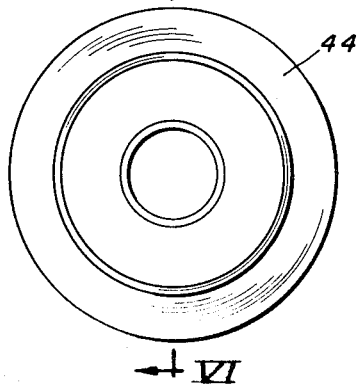
Figure 6:
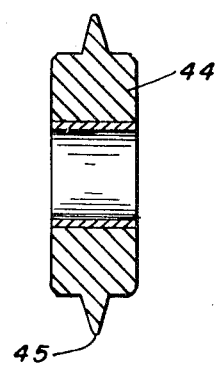

The foregoing and other objects of the invention will be best understood from the following description, reference being had to the accompanying drawings, wherein:

FIG. 1 shows a side view of the severing apparatus;
FIG. 2 is a front view of the main assembly;
FIG. 3 is a partial sectional side view of the main assembly;
FIG. 4 is a front elevation taken substantially along lines IV—IV of FIG. 3;
FIG. 5 is a plan view of the cutter;
FIG. 6 is a cross section of the cutter taken substantially along lines VI—VI of FIG. 5.

The drawings are now referred to for a description of a particular embodiment of the invention. FIG. 1 shows a side view of the severing apparatus which comprises a tube holding assembly 1 and a main assembly 21. Tube holding assembly 1 comprises a support frame 2, clamp housing 4 and hydraulic actuating cylinder 10. Clamp housing 4 comprises clamp lever 6 and clamp jaws 8. The clamp jaws are arranged so as to exert a tensile stress in the axial direction of the tube 5 when hydraulic cylinder 10 is actuated. The main assembly 21 comprises a support frame 22, a stationary housing 42 supported by frame 22, fixed tube support 24 into which the tube 5 to be severed is inserted, support plates 26 and 28 supported by frame 22 and holding fixed tube support 24 in position, hydraulic cylinder 30 attached to support plate 26, conduit 32 which moves in response to hydraulic cylinder 30, hydraulic cylinders 34 and 36 attached to support plate 26, drive sheave 62 attached by "V" belts (not shown) to a motor (not shown) and cutters 44.

FIG. 2 shows a front view of the main assembly 21. It comprises stationary housing 42, cutters 44, locking nuts 46 holding cutters 44 in place, cutter blocks 48, cutter guides 50, adjusting screws 52 for adjusting; i.e., raising or lowering, the position of the cutters 44 through cutter blocks 48 which are slidably mounted in cutter guides 50 and "V" belt 64 for driving sheave 62 (FIG. 1). Cutters 44 are arranged so that each cutter bites into tube 5 simultaneously. The use of three symmetrical cutters is purely exemplary as less than, or more than three cutters can be employed in both symmetrical and non-symmetrical arrangements. Locking nuts 46 permit rotation of the cutters so that worn portions of the cutting edge can be replaced by sharp portions and permit easy removal and replacement of a cutter when its entire edge is worn.

A partial sectional side view of the main assembly is shown in FIG. 3. It comprises parts which drive the cutters around the tube being cut, parts which move the cutters into and out of cutting position and parts which clamp the tube.

The cutter driving parts, i.e., those parts through which motion is transmitted to the cutters 44, comprise drive sheave 62 driven by "V" belts 64 (FIG. 2), pinion shaft 66, pinion 68 rotated by drive sheave 62 through pinion shaft 66, gear 70 meshed to pinion 68, outer movable housing 72 rotated through gear 70 and pinion 68, sliding keys 74 attached to outer movable housing 72, slotted inner movable housing 76 engaging sliding keys 74, bushings 92 separating outer movable housing 72 and slotted inner movable housing 76, pivots 78, links 80 connected to slotted inner movable housing 76 through pivots 78, pivots 82, bell cranks 84 connected to outer movable housing 72 through pivots 82, pivots 86 connecting links 80 and bell cranks 84, rotating bushings 88 engaging bell cranks 84, cutter blocks 48 seating rotating bushings 88, cutter guides 50 and adjusting screws 52 for adjusting the position of cutters 44 through cutter blocks 48 which are slidably mounted in cutter guides 50. They; i.e., the cutter driving parts, are supported in stationary housing 42 through roller bearings 90, separated from fixed tube support 24 by bushings 92, and separated from yokes 94 by roller bearings 90.

The clamping parts comprise conduit 32, clevis 33 connected to conduit 32, hydraulic pressure cylinder 30 connected to clevis 33 for moving conduit 32 back and forth, wedges 35 connected to conduit 32 through bushings 92, wedge clamp ring 37 through which wedges 35 slide back and forth responsive to hydraulic pressure cylinder 30. They; i.e., the clamping parts, exert a holding force on tube 5 when the ram of hydraulic pressure cylinder 30 moves towards the cutters by forcing wedges 35 between wedge clamp ring 37 and tube 5. Although it is preferred to use three wedges 35, it is within the scope of this embodiment to use more or less than three. The wedge clamp 37 can be in the shape of a ring as shown or can assume other appropriate shapes.

The parts which move the cutters into and out of cutting position comprise hydraulic pressure cylinders 34 and 36, yokes 94 connected to hydraulic pressure cylinders 34 and 36, inner movable housing 76 adjacent yokes 94, pivots 78, links 80, pivots 86, bell cranks 84, pivots 82, rotating bushings 88 and cutter blocks 48. When the rams of hydraulic cylinders 34 and 36 move toward cutters 44 motion is transmitted through yokes 94 and inner movable housing 76 to links 80 and to bell cranks 84 which rotate and raise cutters 44 away from tube 5. Conversely, when the rams of hydraulic pressure cylinders 34 and 36 move away from cutters 44, bell cranks 84 rotate in the opposite direction and move cutters 44 inwardly toward tube 5.

FIG. 4 shows a front elevation of the apparatus taken substantially along lines IV—IV of FIG. 3. It comprises stationary housing 42, pinion 68, gear 70, outer movable housing 72, bushing 92, sliding keys 74, slotted inner movable housing 76, wedge clamp ring 37, wedges 35 and tube 5.

The preferred cutter 44 for the apparatus and method of this invention is shown in FIGS. 5 (plan view) and 6 (cross section taken substantially along lines VI—VI of FIG. 5). It is a wedge shaped edge tool with a rounded cutting edge 45 having a hole through its center for mounting (FIG. 3). The rounded cutting edge contributes to the prevention of burr formation by setting up a rolling action at the point of contact, thereby forming shear stresses in the tensile stressed tubes. Its radius is generally in excess of one sixty-fourth inch and is preferably between one sixty-fourth inch and one thirty-second inch. Although the cutting edge shown in FIGS. 5 and 6 is continuous around the circumference of the tool, edge tools with differently configured cutting edges are also within the scope of the preferred cutter of this invention.

Operation of the apparatus shown in FIGS. 1–6 is generally begun by simultaneously raising the cutters 44 out of cutting position and by adjusting the cutters so they will be properly situated when lowered back into cutting position. The cutters are simultaneously raised out of cutting position by moving the rams of hydraulic cylinders 34 and 36 in the direction of the tube holding assembly 1. This movement transmits motion through yokes 94, and inner movable housing 76, to links 80 and to bell cranks 84 which rotate and raise the cutters away from the cutting zone. Individual adjustment of the cutters is made through adjusting screws 52. These screws are calibrated to yield a given inward or outward travel per revolution.

When the cutters are properly adjusted and out of cutting position the motor (not shown) which drives the cutters is turned on and the tube to be cut is conveyed to the apparatus. The motor drives the cutters via "V" belts 64, drive sheave 62 and the other parts described above in connection with FIG. 3. The tube is conveyed by conventional conveyor tables (not shown) and inserted into and through both fixed tube support 24 of main assembly 21 and clamp housing 4 of tube holding assembly 1. Conveying is stopped when the tube reaches an adjustable stop (not shown) which is located at the exit end of the tube holding assembly and which is positioned so that a section of predetermined length is cut.

The conveyed tube is then clamped and subsequently severed by the cutters which are lowered into cutting position. Clamping is preferably performed in two stages with the clamping mechanism of main assembly 21 being actuated prior to the clamping mechanism of tube holding assembly 1. First clamping action, therefore, occurs when the ram of hydraulic cylinder 30 pushes conduit 32 which forces wedges 35 between wedge clamp ring 37 and tube 5. Second clamping action occurs through hydraulic cylinder 10, clamp lever 6 and clamp jaws 8 which pull the tube 5 forward and create a tensile stress in its axial direction. The tensile stress should generally be in excess of 500 psi when metals are being cut. For stainless steel and other alloy steels a minimum stress of 2,000 psi is preferred. The maximum stress should be lower than the stress at which the material being cut permanently deforms. After clamping the cutters are lowered into cutting position and passed into and through the wall of the tube, thereby severing it. The cutters are lowered into cutting position by moving the rams of hydraulic cylinders 34 and 36 away from tube holding assembly 1. This movement transmits motion through yokes 94, and inner movable housing 76 to links 80 and to bell cranks 84 which rotate and raise the cutters away from the cutting zone.

After the tube is severed the cutters are moved out of cutting position and the severed section is removed by conventional conveyor tables (not shown). The remainder of the tube is then brought forward and the operation proceeds once again as described above. The motor which drives the cutters is generally left on during operation unless an adjustment of the cutters is necessitated by the introduction of tubes of a different size. Although the motor has been described as being turned on prior to conveyance of the tube into the apparatus it is within the scope of this invention to turn the motor on after conveyance or after clamping.

From the above paragraphs it will be apparent to those skilled in the art that the novel principles of the invention disclosed herein in connection with specific examples thereof will suggest various other modifications and applications of the same. It is accordingly desired that in construing the breadth of the appended claims they should not be limited to the specific examples described herein.

I claim:

1. A method for severing a tube which comprises: applying tensile stress in the axial direction of said tube; providing relative revolving motion between said tube and at least one cutter; inducing a rolling action at the point of contact between said at least one cutter and said tube wall and passing said at least one cutter into and through said tube.

2. A method according to claim 1 wherein said tensile stress is at least about 500 psi.

3. A method according to claim 1 wherein said tube is an alloy steel and wherein said tensile stress is at least about 2,000 psi.

4. A method according to claim 1 wherein said rolling action is induced by an edge tool with a rounded cutting edge having a radius in excess of one sixty-fourth of an inch.

5. A method according to claim 1 including the steps of inserting said tube into a support tube and clamping said tube in said support tube prior to applying a tensile stress along the longitudinal axis of said tube.

* * * * *